(12) United States Patent
Gollapudi et al.

(10) Patent No.: US 8,099,417 B2
(45) Date of Patent: Jan. 17, 2012

(54) SEMI-SUPERVISED PART-OF-SPEECH TAGGING

(75) Inventors: Sreenivas Gollapudi, Cupertino, CA (US); Rina Panigrahy, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 11/954,216

(22) Filed: Dec. 12, 2007

(65) Prior Publication Data

US 2009/0157643 A1 Jun. 18, 2009

(51) Int. Cl.
*G06F 17/30* (2006.01)
(52) U.S. Cl. .................. 707/748; 707/E17.108
(58) Field of Classification Search .......... 707/3–7, 707/10, 102, 104.1, 999.005, 748, E17.108
See application file for complete search history.

(56) References Cited

U.S. PATENT DOCUMENTS

| | | | |
|---|---|---|---|
| 5,950,189 A * | 9/1999 | Cohen et al. ................ | 707/3 |
| 5,978,797 A * | 11/1999 | Yianilos ..................... | 707/3 |
| 6,125,361 A * | 9/2000 | Chakrabarti et al. ........ | 707/3 |
| 6,640,218 B1 * | 10/2003 | Golding et al. ............. | 707/2 |
| 7,197,497 B2 | 3/2007 | Cossock | |
| 2002/0073079 A1 | 6/2002 | Terheggen | |
| 2004/0044565 A1 * | 3/2004 | Kumar et al. .............. | 705/14 |
| 2004/0255237 A1 | 12/2004 | Tong | |
| 2005/0015366 A1 * | 1/2005 | Carrasco et al. ............ | 707/3 |
| 2005/0165757 A1 | 7/2005 | Broder | |
| 2005/0246321 A1 * | 11/2005 | Mahadevan et al. ........ | 707/3 |
| 2005/0262050 A1 | 11/2005 | Fagin et al. | |
| 2006/0074903 A1 | 4/2006 | Meyerzon et al. | |
| 2007/0016491 A1 | 1/2007 | Wang et al. | |
| 2007/0106659 A1 | 5/2007 | Lu et al. | |
| 2008/0256056 A1 * | 10/2008 | Chang et al. .............. | 707/5 |

OTHER PUBLICATIONS

Dupret, et al., "Web Search Engine Evaluation Using Click through Data and a User Model", Date: May 8-12, 2007, Latin America, Banff, Canada.
Radlinski, et al., "Evaluating the Robustness of Learning from Implicit Feedback", Cornell University, Ithaca, NY, USA, Date: 2005.
Zhang, et al., "Comparing Click Logs and Editorial Labels for Training Query Rewriting", Date: May 8-12, 2007, Empire Ave, Burbank, CA.

* cited by examiner

*Primary Examiner* — Tim T Vo
*Assistant Examiner* — Shiow-Jy Fan (57) ABSTRACT

Relevant search results for a given query may be determined using click data for the query and the number of times the query is issued to a search engine. The number of clicks that a result receives for the given query may provide a feedback mechanism to the search engine on how relevant the result is for the given query. The frequency of a query along with the associated clicks provides the search engine with the effectiveness of the query in producing relevant results. Edges in a graph of queries versus results may be weighted in accordance with the click data and the efficiency to rank the search results provided to a user.

20 Claims, 5 Drawing Sheets

SEMI-SUPERVISED PART-OF-SPEECH TAGGING

BACKGROUND

The effectiveness of a search engine is measured by the relevance of the search results to the input user query. Search queries usually contain several words that define one or more concepts. Typically, some of the words in a search query are more relevant to defining the concepts than others. A search engine has no way of knowing which words in a search query are most relevant. As a result, search engines typically turn up many search results that are not relevant to the user's intent. Current measures of relevance include the similarity of the document's content to the given query and other metadata like the number of clicks a document receives for the given query. However, the click data is sparse and the number of unique documents clicked for a given query is small. The problem gets exacerbated for tail queries. So this provides little information about the relevance of documents not clicked for the given query.

SUMMARY

Search results for a given query may be determined using click data for the query and the number of times the query is issued to a search engine. The frequency of a query along with the associated clicks of results to the query provides the search engine with the effectiveness of the query in producing relevant results. Edges in a graph of queries versus results may be weighted in accordance with the click data and the efficiency to rank the search results provided to a user. The weighting may be normalized to determine the relative importance of clicks for a given query.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
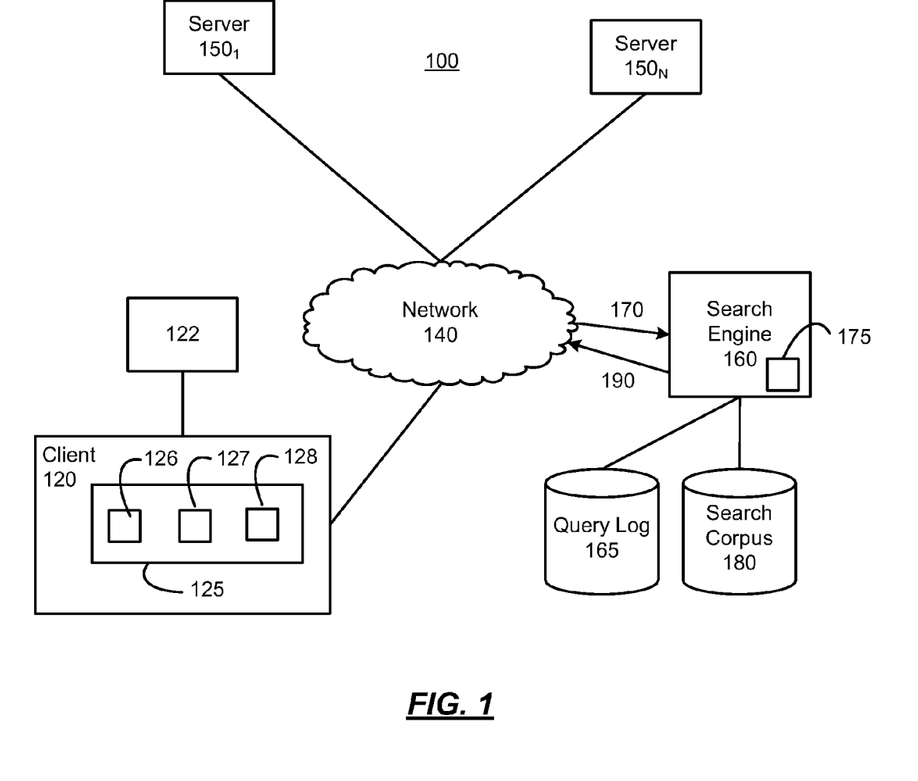
FIG. 1 illustrates an exemplary network environment.

FIG. 1 illustrates an exemplary network environment 100. In the network 100, a client 120 can may communicate through a network 140 (e.g., Internet, WAN, LAN, 3G, or other communication network), with a plurality of servers $150_1$ to $150_N$. The client 120 may communicate with a search engine 160. The client 120 may by configured to communicate with any of the servers $150_1$ to $150_N$ and the search engine 160 to access, receive, retrieve and display media content and other information such as web pages and web sites.

In some implementations, the client 120 may include a desktop personal computer, workstation, laptop, PDA, cell phone, or any WAP-enabled device or any other computing device capable of interfacing directly or indirectly with the network 140. The client 120 may run an HTTP client, e.g., a browsing program, such as MICROSOFT INTERNET EXPLORER or other browser, or a WAP-enabled browser in the case of a cell phone, PDA or other wireless device, or the like, allowing a user of the client 120 to access, process and view information and pages available to it from the servers $150_1$ to $150_N$.

The client 120 may also include one or more user interface devices 122, such as a keyboard, a mouse, touch-screen, pen or the like, for interacting with a graphical user interface (GUI) provided by the browser on a display (e.g., monitor screen, LCD display, etc.), in conjunction with pages, forms and other information provided by the servers $150_1$ to $150_N$ or other servers. Implementations described herein are suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to an implementation, a client application 125 executing on the client 120 may include instructions for controlling the client 120 and its components to communicate with the servers $150_1$ to $150_N$ and the search engine 160 and to process and display data content received therefrom. Additionally, the client application 125 may include various software modules for processing data and media content. For example, the client application 125 may include one or more of a search module 126 for processing search requests and search result data, a user interface module 127 for rendering data and media content in text and data frames and active windows, e.g., browser windows and dialog boxes, and an application interface module 128 for interfacing and communicating with various applications executing on the client 120. Further, the user interface module 127 may include a browser, such as a default browser configured on the client 120 or a different browser.

According to an implementation, the search engine 160 is configured to provide search result data and media content to the client 120, and the servers $150_1$ to $150_N$ are configured to provide data and media content such as web pages to the client 120, for example, in response to links selected in search result pages provided by the search engine 160. The search engine 160 may reference various collection technologies for collecting information from the World Wide Web and for populating one or more indexes with, for example, pages, links to pages, etc. Such collection technologies include automatic web crawlers, spiders, etc., as well as manual or semi-automatic classification algorithms and interfaces for classifying and ranking web pages within a hierarchical structure. In certain aspects, the search engine 160 may also be configured search related algorithms within a ranking engine 175 for processing and ranking web pages, such as for example, the PageRank algorithm. The search engine 160 may also record search queries in the form of a query log 165.

In an implementation, the search engine 160 may be configured to provide data responsive to a search query 170 received from the client 120, via the search module 126. The servers $150_1$ to $150_N$ and 160 may be part of a single organization, e.g., a distributed server system such as that provided to users by search provider, or they may be part of disparate organizations. The servers $150_1$ to $150_N$ and the search engine 160 each may include at least one server and an associated database system, and may include multiple servers and associated database systems, and although shown as a single block, may be geographically distributed.

According to an implementation, the search engine 160 may include algorithms that provide search results to users in response to the search query 170 received from the client 120. The search engine 160 may be configured to increase the relevance of the results of search queries received from client 120, as discussed in detail below. The search query 170 may be transmitted to the search engine 160 to initiate an Internet search (e.g., a web search). The search engine 160 locates content matching the search query 170 from a search corpus 180. The search corpus 180 represents content that is accessible via the World Wide Web, the Internet, intranets, local networks, and wide area networks.

The search engine 160 may retrieve content from the search corpus 180 that matches search the query 170 and transmit the matching content (i.e., search results 190) to the client 120 in the form of a web page to be displayed in the user interface module 127. In some implementations, the most relevant search results are displayed to a user in the user interface module 127.

According to an implementation, the relevance of a document may be measured by looking at its click data over all queries in the query log 165. The clicks a result receives for a given query often provides useful feedback to the search engine 160 on the relevance of the search results 190 for a given query. Thus, the clicks a URL in the search results 190 receives for a given query and the number of times a query is issued to the search engine 160 are used to determine the set of relevant results for the given query. In some implementations, the frequency of a query, along with the associated clicks, may provide the search engine 160 the effectiveness of the query in producing relevant results. This may be based upon the personalized page rank approach.

The PageRank r(p) of a page p is the global importance of the page with no dependence on any specific user or query. The rank r(p) is obtained from the stationary distribution of a homogeneous Markov chain. Such a Markov chain is specified by a stochastic matrix M of transition probabilities between nodes in the graph and a start state which is typically chosen according to a uniform distribution. Thus, the state after t time steps is $sM^t$. The stationary point corresponds to a state distribution that does not change after a sufficiently large number of time steps. An alternative way to specify the Markov process is by the recurrence $r_{t+1} = Mr_t$.

In some implementations, this may include a teleportation to a random node in the graph with a small probability $\alpha$. This accounts for dangling links (or dead ends) in a walk. In this case, the recurrence is written as $r_{t+1} = (1-\alpha)Mr_t + \alpha s$, where s is a random vector representing a singleton set consisting of the random page. In the case when the transition probabilities are associated with edges in a graph (like the web graph), a Markov chain is a random walk on the graph.

In some implementations, the personalized page rank algorithm modifies this recurrence to include the presence of a set of preferred pages P, represented by a preference vector p, as $r_{t+1} = (1-\alpha)Mr_t + \alpha p$. Thus, the set s in the PageRank algorithm is replaced by the preference set p. Therefore, the pages in the preferred set P are more likely to be visited by the a web user than other pages. The underlying graph considered in the above algorithms is the web graph which essentially embodies the link structure between documents on the web.

Figure 2:
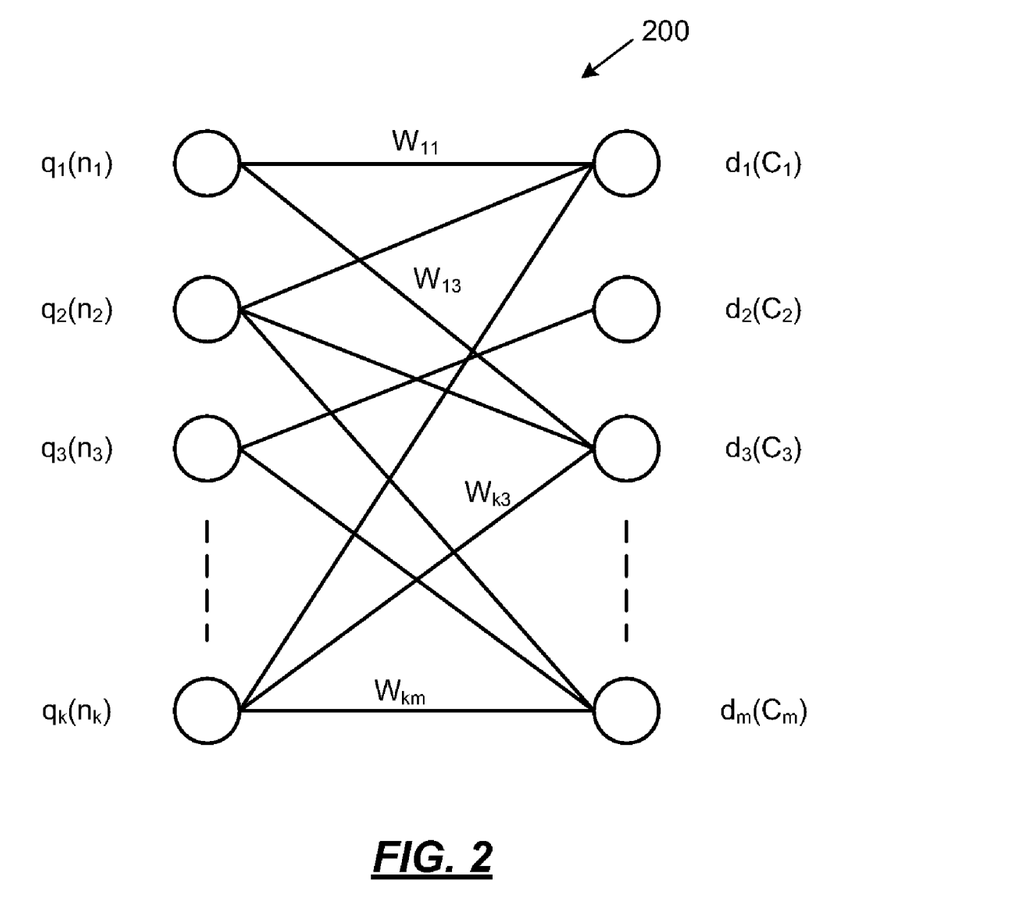
FIG. 2 illustrates a bipartite graph of queries and documents.

Referring to FIG. 2, there is illustrated a bipartite graph 200 of queries and documents. The bipartite graph consists of nodes represented by queries $q_i$ and their frequencies $n_i$ on the left and nodes represented by web results $d_j$ with clicks $C_j$ on the right. The edges in the graph connect queries on the left and their corresponding clicked results on the right. The weight on edge connecting query i and document j is defined as $w_{ij}$ and this is a function of the number of clicks document j receives for query i, $c_{ij}$, and the effectiveness of query I, $e(q_i)$.

The effectiveness of a query $q_i$ may be defined as:

$$e(q_i) = \frac{\sum_j c_{ij}}{n_i}$$

which is the fraction of time a query $q_i$ produced a result that was clicked. This may be a measure of how satisfied the user was with the results of the query. In some implementations, $(1-e(q_i))$ could be used as a measure of user dissatisfaction, also known as DSAT, of the query.

A number of clicks a query receives may be as follows:

$$c_j = \sum_j c_{ji}$$

A formulation of $w_{ij}$ may be based on both the number of clicks on document $d_j$ and the effectiveness of the query $q_i$. In the context of a Markov chain on the bipartite graph, this weight represents the transition probability from node $q_i$ to node $d_j$. A characterization of the weight may be as follows:

$$w_{ij} = e(q_i)c_{ij}$$

where the weighted number of clicks is considered instead of the clicks directly. Using this formulation, the weights may be normalized as:

$$\hat{w}_{ij} = w_{ij} \bigg/ \sum_i w_{ij}$$

and $$\hat{w}_{ji} = w_{ij} \bigg/ \sum_j w_{ij}$$

The normalized weights provide for interpreting the weights as transition probabilities when performing a random walk on the graph. This formulation provides for a characterization of query and document similarities in that similarity between queries and documents may be computed efficiently. Highly similar queries share nearly the same weighted set of documents with weights corresponding to $w_{ij}$. Likewise, similar documents will share nearly the same weighted set of queries. In other words, similar queries will have (approximately) similar click distribution on (approximately) similar document sets.

Figure 3:
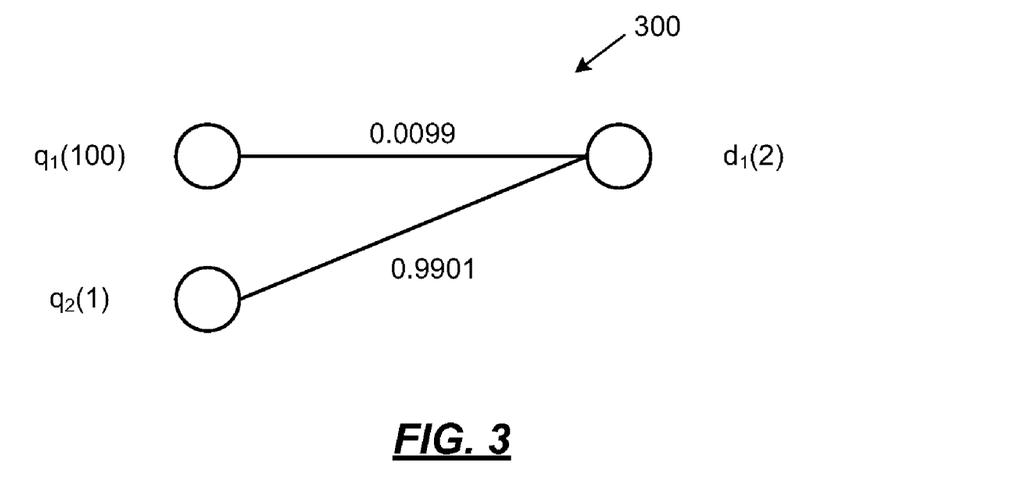
FIG. 3 illustrates a graph having weighted clicks.

The normalized weights provide for handling of spurious clicks and highly ineffective queries where highly ineffective queries and query-document edges arising out of spurious clicks are dissimilar from other effective queries that share clicks on the same document. Consider the example shown in FIG. 3 where two queries $q_1$ and $q_2$ with frequencies 100 and 1 respectively are shown in graph 300. Both queries result in clicks on the same document $d_1$. Query $q_1$ is an ineffective query with $e(q_1)=0.01$, while $e(q_2)=1.0$.

Figure 4:
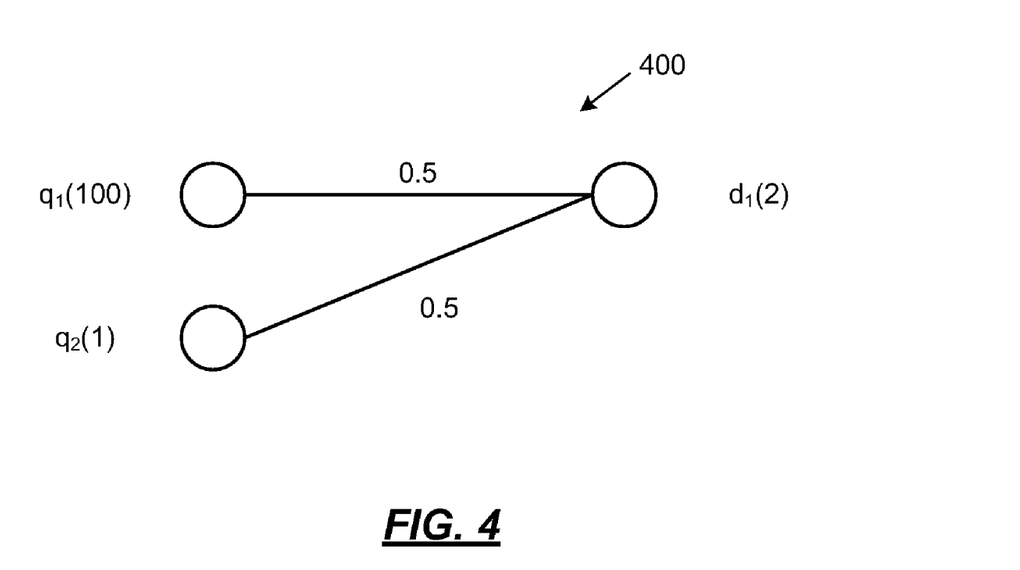
FIG. 4 illustrates a graph having un-weighted clicks.

As shown in the graph 400 of FIG. 4, if the effectiveness of a query is not considered in the computation of the transition probability on an edge, then a random user could reach $q_2$ from $q_1$ with high probability while in the case of weighted clicks (FIG. 3), the probability reduces dramatically.

In some implementations, the personalized page rank algorithm may be applied to the graph described in FIG. 2 to rank the results. In such a case, the matrix M is the transition matrix with entries $M_{ij}=w_{ij}$, and the preference set $P_i$ is the singleton $\{q_i\}$.

Figure 5:
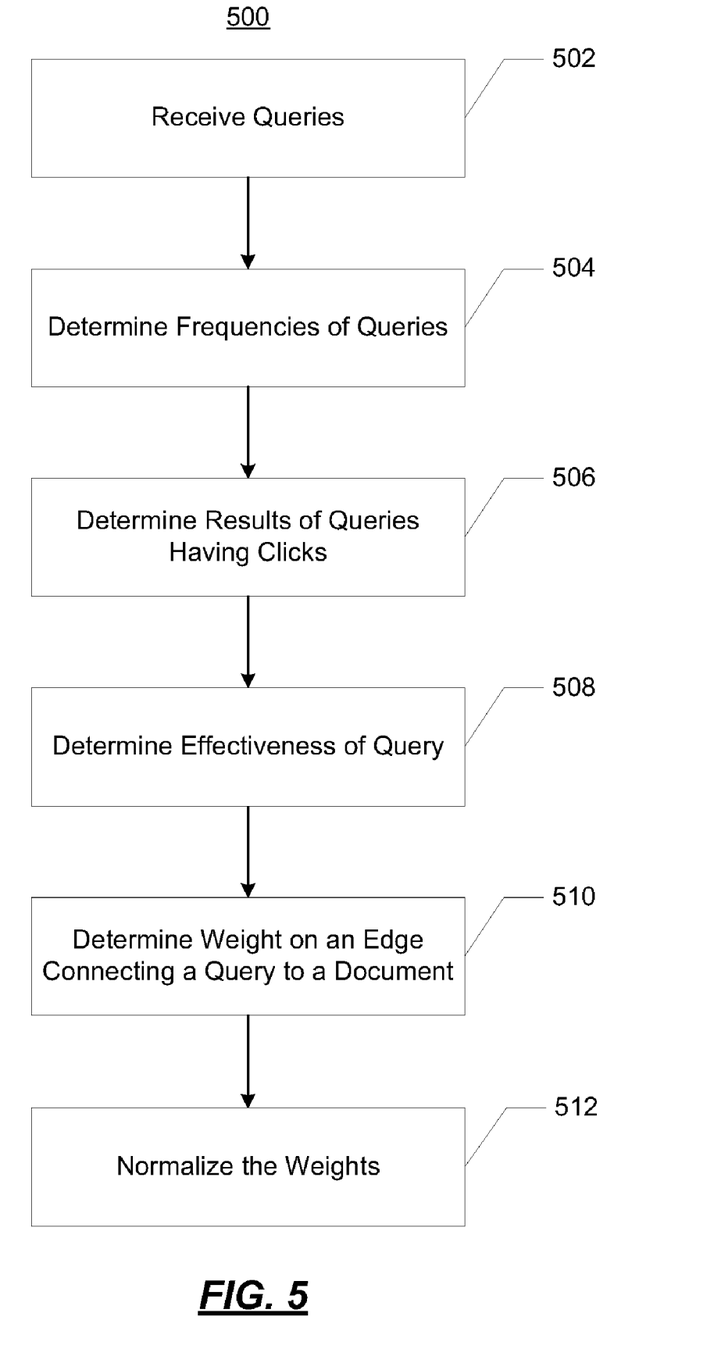
FIG. 5 illustrates an exemplary process of weighting query results.

FIG. 5 illustrates an exemplary process 500 of weighting query results. The process begins at stage 502, where queries are received. Queries 170 communicated by the client 120 may be received by the search engine 160. At stage 504, the frequencies of queries are determined, and at stage 506, the results of queries having clicks is determined. The query log 165 may be analyzed to determine a number of clicks documents receive for unique queries received at the search engine 160.

At stage 508, the effectiveness of a query is determined. The effectiveness of a query may be determined as the fraction of time a query produced a result that was clicked. At stage 510, a weight on an edge connecting a query to a document is determined. The weight may be based on the number of clicks a document receives and the effectiveness of the query as determined at stages 506 and 508. At stage 512, the weights of the edges are normalized. The weights may be normalized by dividing the weight of an edge by the sum of the weights of all edges.

Exemplary Computing Arrangement

Figure 6:
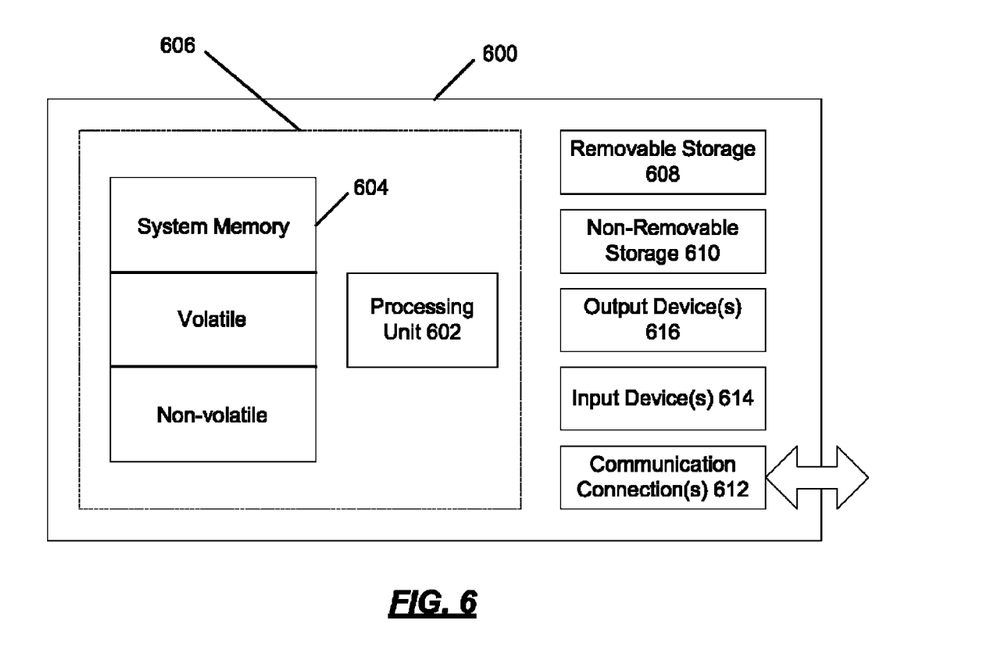
FIG. 6 shows an exemplary computing environment.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of ranking query results, comprising:
receiving queries from users at a computing device comprising a search engine configured to provide query results responsive to the queries from the users;
creating a bipartite graph of queries versus documents selected from query results responsive to the queries of the bipartite graph;
analyzing frequencies of the queries of the bipartite graph, wherein a frequency of a particular query is based on number of times the particular query is issued from the users to the search engine;
determining an effectiveness of each of the queries of the bipartite graph, wherein an effectiveness of a particular query is determined by dividing number of times the particular query resulted in the users making a selection of any document from the query results provided by the search engine responsive to the particular query by the frequency of the particular query; and
weighting a plurality of edges in the bipartite graph, wherein a weight of an edge representing a transition probability from a particular query to a particular document in the bipartite graph is determined by multiplying a frequency of selection of the particular document for the particular query by the effectiveness of the particular query.

2. The method of claim 1, further comprising:
normalizing weights on the plurality of edges representing transition probabilities in the bipartite graph.

3. The method of claim 2, wherein normalizing is determined in accordance with the sum of the weights on all edges associated with a particular query.

4. The method of claim 1, further comprising:
parsing a query log to determine the frequencies of the queries and click data associated with the particular document and the particular query.

5. The method of claim 1, wherein the number of times the particular query resulted in the users making a selection of any document from the query results provided by the search engine responsive to the particular query is based on click data associated with the particular query.

6. The method of claim 1, wherein the frequency of selection of the particular document for the particular query is based on number of clicks from users the particular document receives when provided by the search engine in search results responsive to the particular query.

7. The method of claim 1, further comprising:
walking the bipartite graph; and
ranking the query results in an order of relevance.

8. A system for ranking query results, comprising:
a search engine at a computing device that receives a plurality of queries from users over a network connection, the search engine configured to provide query results responsive to the queries from the users;
a query log for maintaining historical data about the plurality of queries and a plurality of query results; and
a ranking engine that:
creates a bipartite graph of queries versus documents selected from query results responsive to the queries of the bipartite graph,
analyzes frequencies of the queries of the bipartite graph maintained by the query log, wherein a frequency of a particular query is based on number of times the particular query is issued from the users to the search engine,
determines an effectiveness of each of the queries of the bipartite graph, wherein an effectiveness of a particular query is determined by dividing number of times the particular query resulted in the users making a selection of any document selected from the query results provided by the search engine responsive to the particular query by the frequency of the particular query, and
determines a weight on each edge of the bipartite graph, wherein a weight of an edge representing a transition probability from a particular query to a particular document in the bipartite graph is determined by multiplying a frequency of selection of the particular document for the particular query by the effectiveness of the particular query.

9. The system of claim 8, wherein the ranking engine normalizes weights on the edges representing transition probabilities in the bipartite graph.

10. The system of claim 9, wherein the ranking engine normalizes the weights in accordance with the sum of the weights of all edges associated with a particular query.

11. The system of claim 8, wherein the ranking engine determines the frequencies of the queries and click data associated with the particular document and the particular query.

12. The system of claim 8, wherein the number of times the particular query resulted in the users making a selection of any document from the query results provided by the search engine responsive to the particular query is based on click data associated with the particular query.

13. The system of claim 8, wherein the ranking engine walks the bipartite graph and ranks the query results in an order of relevance.

14. A computer readable storage medium storing computer readable instructions that, when executed, cause a computing device to:
receive queries from users at a computing device comprising a search engine configured to provide query results responsive to the queries from the users;
create a bipartite graph of queries versus documents selected from query results responsive to the queries of the bipartite graph;
analyze frequencies of the queries of the bipartite graph, wherein a frequency of a particular query is based on number of times the particular query is issued from the users to the search engine;
determine an effectiveness of each of the queries of the bipartite graph, wherein an effectiveness of a particular query is determined by dividing number of times the particular query resulted in the users making a selection of any document from the query results provided by the search engine responsive to the particular query by the frequency of the particular query; and
weight a plurality of edges in the bipartite graph, wherein a weight of an edge representing a transition probability from a particular query to a particular document in the bipartite graph is determined by multiplying a frequency of selection of the particular document for the particular query by the effectiveness of the particular query.

15. The computer readable storage medium of claim 14, further comprising computer readable instructions for:
normalizing weights on the plurality of edges representing transition probabilities in the bipartite graph.

16. The computer readable storage medium of claim 15, wherein normalizing is determined in accordance with the sum of the weights on all edges associated with a particular query.

17. The computer readable storage medium of claim 14, further comprising computer readable instructions for:

parsing a query log to determine the frequencies of the queries and click data associated with the particular document and the particular query.

18. The computer readable storage medium of claim 14, wherein the number of times the particular query resulted in the users making a selection of any document from the query results provided by the search engine responsive to the particular query is based on click data for the particular query.

19. The computer readable storage medium of claim 14, wherein the frequency of selection of the particular document for the particular query is based on number of clicks from users the particular document receives when provided by the search engine in search results responsive to the particular query.

20. The computer readable storage medium of claim 14, further comprising computer readable instructions for:
   walking the bipartite graph; and
   ranking the query results in an order of relevance.

* * * * *